US011639169B2

(12) United States Patent
Kang

(10) Patent No.: US 11,639,169 B2
(45) Date of Patent: May 2, 2023

(54) SYSTEM, METHOD, INFRASTRUCTURE, AND VEHICLE FOR AUTOMATED VALET PARKING

(71) Applicants: HYUNDAI MOTOR COMPANY, Seoul (KR); KIA MOTORS CORPORATION, Seoul (KR)

(72) Inventor: Dong Hoon Kang, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 232 days.

(21) Appl. No.: 17/101,919

(22) Filed: Nov. 23, 2020

(65) Prior Publication Data
US 2021/0162988 A1 Jun. 3, 2021

(30) Foreign Application Priority Data
Nov. 28, 2019 (KR) .................. 10-2019-0155502

(51) Int. Cl.
*B60W 30/06* (2006.01)
*B60W 60/00* (2020.01)
(Continued)

(52) U.S. Cl.
CPC ........ *B60W 30/06* (2013.01); *B60W 50/0205* (2013.01); *B60W 50/045* (2013.01); *B60W 60/001* (2020.02); *B60W 60/0053* (2020.02); *G01C 21/3407* (2013.01); *G08G 1/142* (2013.01); *B60W 2420/40* (2013.01); *B60W 2420/42* (2013.01); *B60W 2420/52* (2013.01); *B60W 2420/54* (2013.01);
(Continued)

(58) Field of Classification Search
CPC ............ B60W 30/06; B60W 60/0053; B60W 60/001; B60W 50/0205; B60W 50/045; B60W 2420/40; B60W 2420/42; B60W 2420/52; B60W 2420/54; B60W 2510/10; B60W 2510/18; B60W 2510/20; G01C 21/3407; G08G 1/142
See application file for complete search history.

(56) References Cited

U.S. PATENT DOCUMENTS

2010/0156672 A1 6/2010 Yoo et al.
2017/0061508 A1* 3/2017 Sen .................. G08G 1/144
(Continued)

FOREIGN PATENT DOCUMENTS

EP 3539851 A1 9/2019
KR 10-2018-0107892 A 10/2018

OTHER PUBLICATIONS

European Search Report dated Apr. 13, 2021 from the corresponding European Application No. 20209954.5, 9 pp.

*Primary Examiner* — Peter D Nolan
*Assistant Examiner* — Kenneth M Dunne
(74) *Attorney, Agent, or Firm* — Lempia Summerfield Katz LLC

(57) ABSTRACT

An automated valet parking system, an automated valet parking method, and an automated valet parking infrastructure, and a vehicle having an automated valet parking feature are disclosed. In particular, the vehicle can autonomously move to and park in a designated parking spot by communicating with the infrastructure. In addition, the vehicle can autonomously move to a pickup area from a parking spot by communicating with the infrastructure.

20 Claims, 12 Drawing Sheets

(51) Int. Cl.
    *B60W 50/02*     (2012.01)
    *B60W 50/04*     (2006.01)
    *G01C 21/34*     (2006.01)
    *G08G 1/14*     (2006.01)

(52) U.S. Cl.
    CPC ..... *B60W 2510/10* (2013.01); *B60W 2510/18* (2013.01); *B60W 2510/20* (2013.01)

(56) References Cited

U.S. PATENT DOCUMENTS

| | | | |
|---|---|---|---|
| 2018/0286249 A1* | 10/2018 | Nordbruch | G08G 1/168 |
| 2018/0301031 A1* | 10/2018 | Naamani | G08G 1/096861 |
| 2018/0341257 A1* | 11/2018 | Nordbruch | G08G 1/146 |
| 2019/0283736 A1* | 9/2019 | Watanabe | B60W 30/06 |
| 2020/0130676 A1* | 4/2020 | Smid | G05D 1/0231 |
| 2020/0150657 A1* | 5/2020 | Yoo | B60R 25/209 |
| 2020/0159236 A1* | 5/2020 | Yoon | B60R 25/2063 |
| 2020/0180607 A1* | 6/2020 | Choi | G08G 1/146 |
| 2020/0210731 A1* | 7/2020 | Yamanaka | G05D 1/021 |
| 2021/0163021 A1* | 6/2021 | Frazzoli | B60W 50/02 |

\* cited by examiner

Fig. 4A

| Step | Infra | Vehicle |
|---|---|---|
| <1> AVPS START | ● Recognize and qualify an appropriate user (by user ID and PW) and vehicle (by unique number assigned to vehicle)<br>● Manage driving authority (receiving driving authority from the user/return the driving authority to the user<br>● Transmit automated driving start instruction to vehicle | ● Perform engine ON/OFF or power ON/OFF according to the instruction of infra<br>● Lock the vehicle according to the instruction of infra<br>● Determine human or animal inside the vehicle |
| <2> DETERMINATION OF TARGET POSITION AND GUIDE ROUTE | ● Determine the target position, guide route, and permissive driving area, and deliver those information to vehicle | |
| <3> AUTONOMOUS DRIVING | ● Instruct automated driving (start, stop, re-start) to vehicle | ● Drive along the guide route designated by infra within the permitted driving area at a speed of 10km/h or less<br>● Drive within the path and width designated by infra without deviation<br>● Drive along a curve with the minimum inner radius of the vent designated by the infra without deviation<br>● Drive on a path with the gradient less than or equal to the maximum gradient designated by infra |
| <4> POSITION MEASUREMENT (vehicle, obstacle) | ● Be aware of and manage vehicle location<br>● Detect and recognize vehicle and obstacles (TBD), and monitor safety driving and parking operation of each vehicle (supervise) | ● Estimate its own position<br>● Inform the infra of its estimated position/with the accuracy and frequency specified below (TBD)<br>● Inform the infra of its own status<br>● Detect the following obstacles (TBD) |
| <5> AUTONOMOUS PARKING | | ● Park and Stop the vehicle at the target position designated by infra (equivalent to PAPS parking requirements) |

Fig. 4B

| Step | Infra | Vehicle |
|---|---|---|
| <6> EMERGENCY BRAKE | • Continue to instruct automated driving to vehicle when safety is ensured as a result of safety confirmation, and to instruct the vehicle to perform an emergency stop, if safety is not confirmed | • Start/emergency stop/re-start automated driving according to the instruction of infra<br>• Perform an emergency stop in case where a potential hazard is determined as a result of the detection mentioned above<br>• Immediately decelerate at the rate of (TBD) m/s² and stop, when the following conditions are met<br>  (1) vehicle received an instruction from infra for E/S<br>  (2) vehicle detected an obstacle (TBD)<br>• After coming to a stop, the vehicle shall remain stopped until it receives an instruction from infra to resume automated driving<br>• Vehicle shall re-start suspended driving or parking when it receives an instruction to start automated driving rom the infra after confirming that there is no obstacle ahead in the path |
| <7> AVPS END | • After the vehicle completes automated driving and parking, the infra transmits Vehicle control release instruction to the vehicle | • Perform engine ON/OFF or power ON/OFF according to the instruction of infra<br>• Lock the vehicle according to the instruction of infra<br>• Mechanically fix or restrain wheels using such as the parking brake |
| <8> FAULT CONTROL (communication or vehicle fault) | • Detect communication faults between the infra and vehicle | • Detect faults in communication with infra during driving<br>• Detect vehicle's faults (e.g. part failure, human or animal remaining inside the vehicle, etc.)<br>• Perform emergency stop when above fault is detected<br>• After coming to a stop, the vehicle shall remain stopped until it receives an instruction from infra to resume automated driving |

Fig. 5

| DATA | Contents | Transmit(T)/Receive(R) | | Regularly(F)/Event(E) Transmission | Note |
|---|---|---|---|---|---|
| | | Infrastructure | Vehicle | | |
| (1) Vehicle qualification information | ID number (VIN) to identify each vehicle | R | T | E When entering the parking | |
| (2) Automated driving preparation instruction | - | T | R | E Right before automated driving start | |
| (3) Vehicle information notification | Vehicle state (normal stop/driving/emergency stop, etc.), vehicle position(should) | R | T | F(1Hz) | This is also used for communication fault check by the vehicle |
| (4) Vehicle information response | - | T | R | F(1Hz) | |
| (5) Target position-guide route Delivery | Target position - Passing point location/Permitted time to pass through the point, Maximum speed | T | R | E After automated driving instruction | |
| (6) Driving boundaries delivery | A group of lines to surround the permitted driving area | T | R | E After automated driving preparation instruction | |
| (7) Automated driving start instruction | - | T | R | E After delivery of guide route and driving boundaries, when restarting after emergency stop | |
| (8) Emergency stop instruction | - | T | R | E | |
| (9) Vehicle control release instruction | - | T | R | E | |

SYSTEM, METHOD, INFRASTRUCTURE, AND VEHICLE FOR AUTOMATED VALET PARKING

CROSS REFERENCE TO RELATED APPLICATION

The present application claims priority to and the benefit of Korean Patent Application No. 10-2019-0155502, filed Nov. 28, 2019, the entire contents of which are incorporated herein by reference.

FIELD

The present disclosure relates to an automated valet parking system, an automated valet parking method, and an automated valet parking infrastructure, and a vehicle having an automated valet parking feature. The present disclosure enables an unmanned vehicle to autonomously move to and park in a designated parking spot by communicating with a parking infrastructure. The present disclosure also enables an unmanned vehicle to autonomously move from a parking spot to a pickup area by communicating with a parking infrastructure.

BACKGROUND

The statements in this section merely provide background information related to the present disclosure and may not constitute prior art.

Many modern cities suffer from various problems associated with vehicle parking. For example, there is a risk of a car collision in a parking lot. For parking in crowded places such as a large shopping center, people spend much time to enter a parking lot around the destination due to traffic congestion. Furthermore, it also takes time to locate an empty parking spot even after entering a parking lot. In addition, there is inconvenience that a driver has to move to a spot at which his or her vehicle is parked at the time of leaving the visited area or that a driver often has difficulty in retrieving his or her vehicle due to forgetting the parking spot where his or her vehicle is parked.

SUMMARY

The present disclosure has been made in view of the problems occurring in the related art and an objective of the present disclosure is to enable an automated valet parking service by which a driver can leave his or her vehicle at a predetermined drop-off area and the vehicle autonomously moves to and parks at an empty parking spot within a parking lot.

Another objective of the present disclosure is to enable an automated valet parking service by which a vehicle parked at a specific parking spot in a parking lot autonomously moves to a predetermined pickup area so that a driver can conveniently leave the parking lot.

The present disclosure provides an automated valet parking method using a parking infrastructure. In particular, the method includes: receiving a parking request for a vehicle; transmitting a first guide route indicating a route from a current position of the vehicle to a designated parking spot, to the vehicle so that the vehicle can perform automated valet parking at the designated parking spot; and changing a parking location of the vehicle by controlling the vehicle parked in the designated parking spot to move to a different parking spot.

According to another forms of the present disclosure, there is provided an automated valet parking infrastructure capable of controlling a vehicle to provide an automated valet parking service, the infrastructure performing the following steps: receiving a parking request for a vehicle; transmitting a first guide route indicating a route from a current position of the vehicle to a designated parking spot; and changing a parking location of the vehicle by controlling the vehicle parked in the designated parking spot to move to a different parking spot.

According to other forms of the present disclosure, there is provided a program including instructions for performing automated valet parking, the program being recorded on a computer-readable recording medium.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIGS. 4A and 4B are diagrams illustrating operations for automated valet parking performed by an infrastructure and a vehicle that work in conjunction with each other, according to one form of the present disclosure;

FIG. 5 is a view illustrating a communication process performed by an automated valet parking infrastructure and a vehicle according to one form of the present disclosure;

Figure 1:
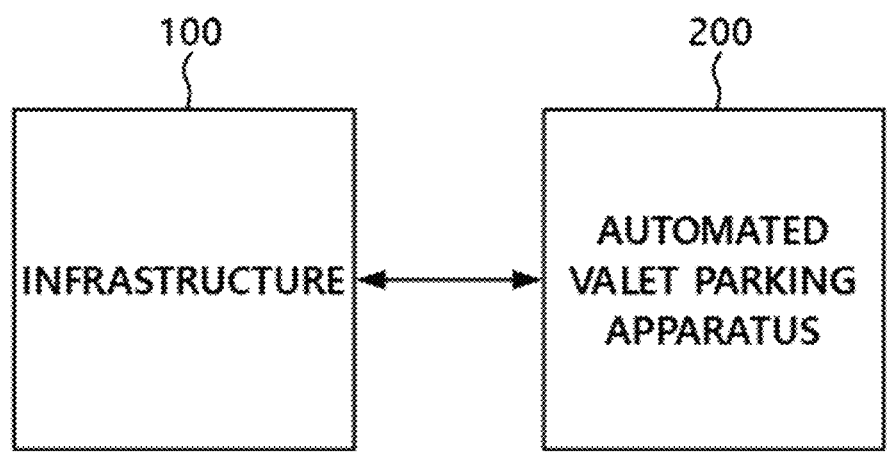
FIG. 1 is a view illustrating an automated valet parking system according to one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Herein below, exemplary forms of the present disclosure will be described in detail with reference to the accompanying drawings. The construction and operational effects of the present disclosure will be clearly understood from a detailed description given below. Prior to describing exemplary forms of the present disclosure in detail, it is noted that throughout the drawings the same components will be denoted by the same reference numerals when possible and a detailed description about components and functions that are well known in the art will be omitted when the subject matter of the present disclosure would be obscured by the description.

Terms and words used in the following detailed description of the present disclosure will be defined first.

The term "driver" refers to a person who uses an automated valet parking service provided by an automated valet parking system.

The term "driving authority" refers to the authority to control vehicle operations. The term "vehicle operation" refers to an operation such as steering, accelerating, braking, gear shifting, ignition ON/OFF operation, and vehicle door locking/unlocking.

The term "vehicle" refers to a vehicle having an automated valet parking feature.

The term "control center" refers to a facility that can monitor vehicles parked in a parking lot. The control center determines a target position, a guide route, a permitted driving area, or the like and transmits various instructions including a driving start instruction and an emergency stop instruction to a vehicle.

The term "infrastructure" includes a parking facility and sensors installed in the parking facility. Alternatively, in some cases, the term "infrastructure" may refer to a control center that controls gates of a parking lot, vehicles existing within a parking lot, etc.

The term "target position" refers to one of the parking spots available for parking. Alternatively, the term "target position" refers to a pickup area where a driver takes his or her vehicle to leave the parking lot.

The term "guide route" refers to a route that guides a vehicle to reach a target position. For example, in a vehicle parking session, the guide route is a route that guides a vehicle from a drop-off area to an empty parking spot. For example, the guide route is provided in the form of instructions. Specifically, it will include instructions such as "move straight 50 m" and "turn left at the next corner".

The term "driving route" refers to a driving path along which a vehicle needs to travel.

The term "permitted driving area" refers to an area where a vehicle can travel within a parking lot. For example, the permitted driving area includes a driving lane. The permitted driving area is defined with barrier walls, parked vehicles, lines, etc.

FIG. 1 is a diagram illustrating an automated valet parking system according to one form of the present disclosure. Referring to FIG. 1, an automated valet parking system 10 includes an infrastructure 100 and an automated valet parking apparatus 200. The term "automated valet parking apparatus" may be referred to as an autonomous valet parking device or vehicle.

The infrastructure 100 refers to an apparatus or system for operating, managing, and controlling constituent elements involved in automated valet parking. For example, the infrastructure 100 may be a facility in a parking lot. According to forms, the infrastructure 100 includes sensors, communication devices, alarm devices, display devices, and a server device that controls those devices. Alternatively, in some cases, the term "infrastructure" may refer to a control center that controls gates of a parking lot, vehicles existing within a parking lot, etc.

The infrastructure 100 includes a communication circuit for enabling communication with external devices and a processor for performing computation operations. According to forms, the infrastructure 100 further includes sensors for detecting nearby objects and for measuring surrounding parameters. In the present disclosure, determinations and computations performed by the infrastructure 100 are performed specifically by the processor included in the infrastructure 100.

The automated valet parking apparatus 200 refers to a vehicle that can perform automated valet parking. According to forms, the automated valet parking apparatus 200 refers to a constituent element or a set of constituent elements of a vehicle, which are desired to perform automated valet parking.

Figure 2:
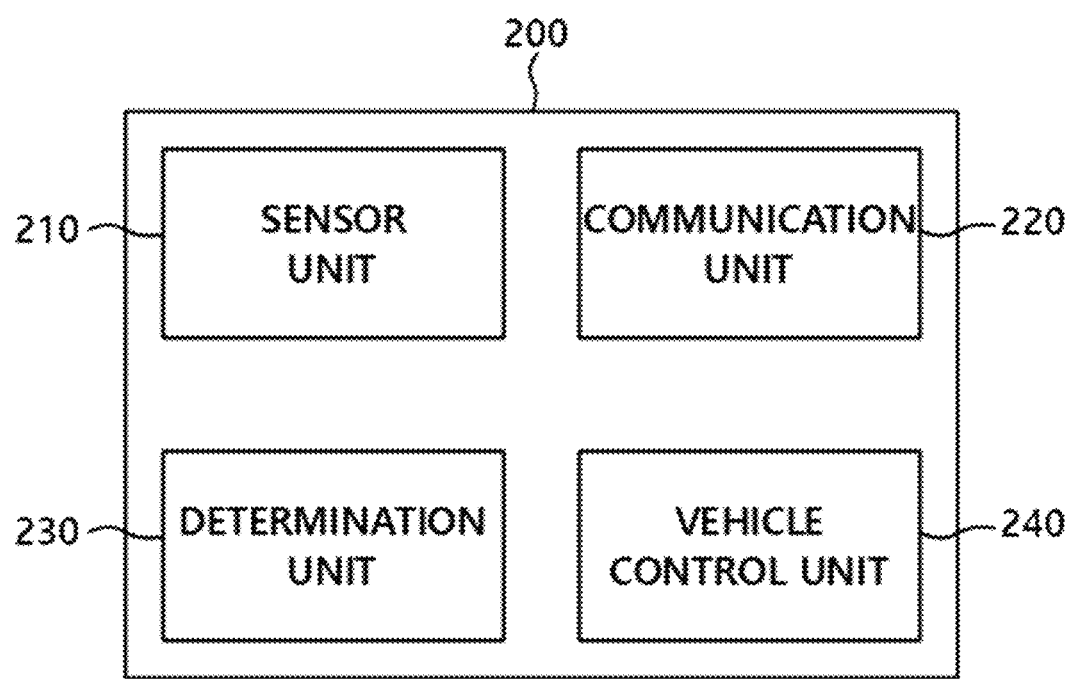
FIG. 2 is a view illustrating an automated valet parking apparatus according to one form of the present disclosure.

FIG. 2 is a diagram illustrating an automated valet parking apparatus according to one form of the present disclosure. Referring to FIG. 2, the automated valet parking apparatus (for example, vehicle 200) includes a sensor unit 210, a communication unit (for example, communication circuit) 220, a determination unit (for example, a processor) 230, and a vehicle control unit 240.

The sensor unit 210 monitors an environment around the automated valet parking apparatus 200. In some forms, the sensor unit 210 measures the distance between the automated valet parking apparatus 200 and a specific object or senses a nearby object around the automated valet parking apparatus 200. For example, the sensor unit 210 includes at least one of the sensors selected from among an ultrasonic sensor, a radar sensor, a LiDAR sensor, a camera, an infrared sensor, a thermal sensor, and a millimeter wave sensor.

The sensor unit 210 is configured to transmit collected data to the communication unit 220 or to the determination unit 230.

The communication unit 220 is configured to communicate data with the infrastructure 100. This communication is called vehicle-to-infra (V2I) communication. The communication unit 220 is configured to communicate data with other vehicles. This communication is called vehicle-to-vehicle (V2V) communication. The V2I communication and the V2V communication are collectively called vehicle-to-everything (V2X) communication. In some forms, the communication unit 220 receives data such as a target position, a guide rote, a driving route, an instruction, or the like from the infrastructure 100, processes the received data, and transmits data generated through the processing to the determination unit 230. The communication unit 220 may transmit data collected and generated by the vehicle 200 to the infrastructure 100. In some forms, the communication unit 220 communicates data with a terminal device owned by the driver of the vehicle 200.

The communication unit 220 receives and transmits data by using a wireless communication protocol or a cable communication protocol. Examples of the wireless communication protocol include but are not limited to wireless LAN (WLAN), digital living network alliance (DLNA), wireless broadband (Wibro), world interoperability for microwave access (Wimax), global system for mobile communication (GSM), code division multi access (CDMA), code division multi access 2000 (CDMA2000), enhanced voice-data optimized or enhanced voice-data only (EV-DO), wideband CDMA (WCDMA), high speed downlink packet access (HSPDA), high speed uplink packet access (HSUPA), IEEE802.16, long term evolution (LTE), long term evolution-advanced (LTE-A), wireless mobile broadband service (WMBS), Bluetooth, infrared data association (IrDA), ultra-wideband (UWB), ZigBee, near field communication (NFC), ultra sound communication (USC), visible light communication (VLC), Wi-Fi, and Wi-Fi direct. Examples of the cable communication protocol include but are not limited to wired local area network (LAN), wired wide area network (WAN), power line communication (PLC), USB communication, Ethernet communication, serial communication, and optical/coaxial cable communication. Other protocols that support communication between devices fall within the definition of the communication protocol that is used in the present disclosure.

The determination unit 230 controls the overall operation of the vehicle 200. The determination unit 230 controls the vehicle control unit 240 on the basis of the data transmitted from the sensor unit 210 and the communication unit 220. In some forms, the determination unit 230 generates a control signal to adaptively control the vehicle control unit 240 according to the data transmitted from the infrastructure 100 and transmits the control signal to the vehicle control unit 240.

That is, the determination unit 230 refers to a device that performs a series of computations or that makes a series of determinations to control the vehicle 200 for the purpose of automated valet parking. For example, the determination unit 230 may be a processor capable of executing a software program including instructions for performing automated valet parking for a vehicle.

Examples of the determination unit 230 include but are not limited to a central processing unit (CPU), a microcontroller unit (MCU), an application specific integrated circuit (ASIC), a field programmable gate array (FPGA), and a graphic processing unit (GPU).

The vehicle control unit 240 controls the vehicle 200 on the basis of the control signal issued by the determination unit 230. In some forms, the vehicle control unit 240 controls the vehicle 200 on the basis of the control signal transmitted from the determination unit 230. Specifically, the vehicle control unit 240 controls various vehicle operations such as driving, stopping, re-driving, steering, accelerating, decelerating, parking, lighting, alarm sounding, etc.

That is, it is noted that the vehicle control unit 240 can perform all functions desired to control the operations of the vehicle 200. Specifically, the vehicle control unit 240 controls a driving unit, a braking unit, a steering unit, an acceleration unit, an alarm unit, and a flasher.

On the other hand, although not explicitly described herein, it is noted that the operations and/or functions of the vehicle 200 are performed by the conjunction of one or more components selected from among the sensor unit 210, the communication unit 220, the determination unit 230, and the vehicle control unit 240.

Figure 3:
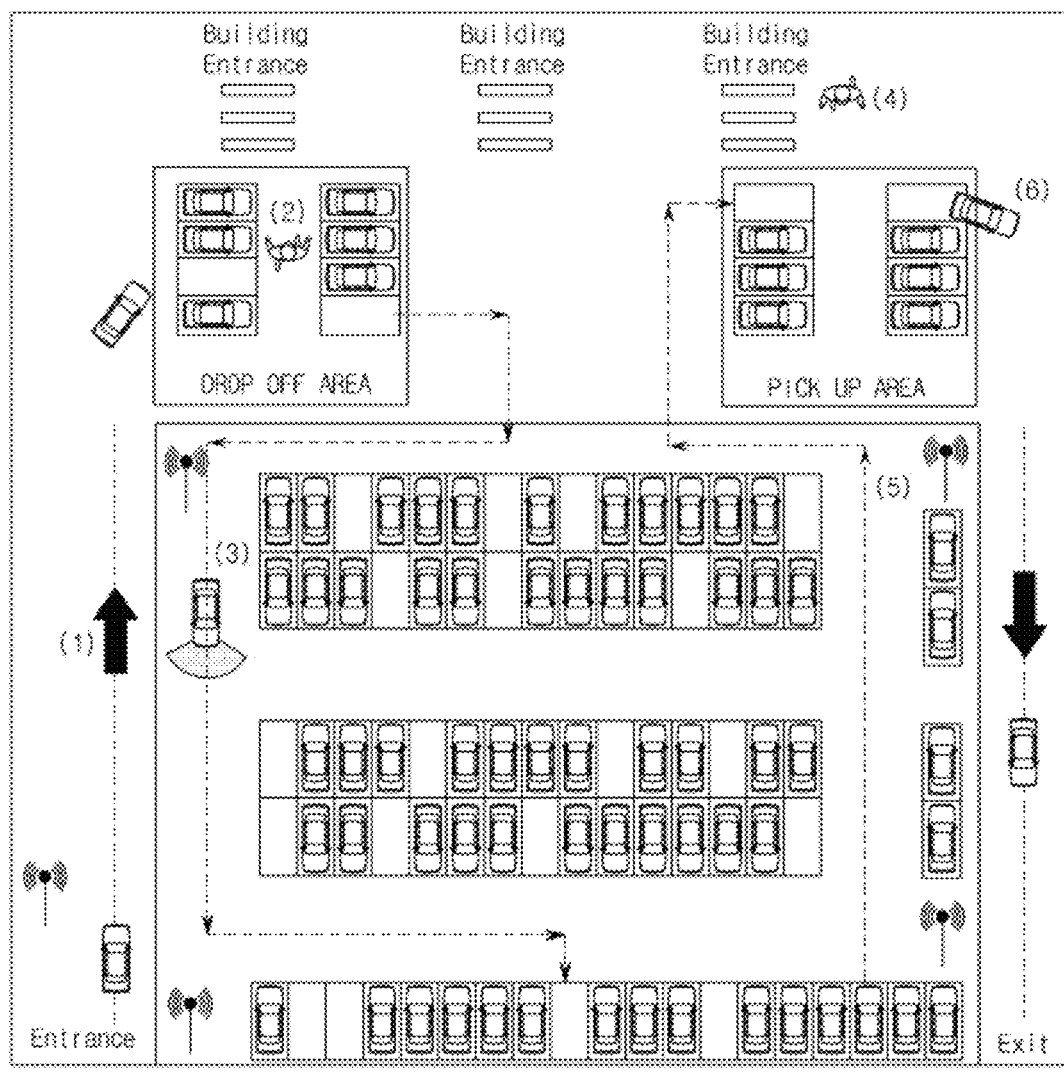
FIG. 3 is a conceptual view illustrating an automated valet parking system and an automated valet parking method according to forms of the present disclosure.

FIG. 3 is a conceptual diagram illustrating an automated valet parking system and an automated valet parking method according to forms of the present disclosure.

Referring to FIG. 3, in step (1), a driver drives a vehicle to a drop-off area in a parking lot.

In step (2), the driver gets out of the vehicle at the drop-off area and a driving authority which is authority to control the vehicle is delegated to the infrastructure.

In step (3), the infrastructure searches for available parking spots in the parking lot and designates one of the available parking spots for the vehicle. The infrastructure determines a guide route leading to the designated parking spot. After the parking spot and the guide route are determined, the vehicle autonomously drives in accordance with the guide route until reaching the designated parking spot and performs autonomous parking at the designated parking spot.

In step (4), the driver moves to a pickup area where the vehicle will be returned to the driver to leave the parking lot.

In step (5), the infrastructure determines a suitable target position. Specifically, the suitable target position may be one of empty parking spots within the pickup area. In addition, the infrastructure determines a guide route which will guide the vehicle to the target position. After the target position and the guide route are determined and transmitted to the vehicle, the vehicle autonomously drives in accordance with the guide route until reaching the target position and performs autonomous parking at the target position.

In step (6), the driver arrives at the pickup area and takes over the driving authority for the vehicle. That is, the driving authority is returned to the driver from the infrastructure. The driver drives the vehicle toward the exit of the parking lot.

FIGS. 4A and 4B are diagrams illustrating operations performed by an infrastructure and a vehicle for automated valet parking, according to one form of the present disclosure.

Item (1) describes operations of the infrastructure and the vehicle to initiate an automated valet parking procedure. The infrastructure identifies a driver and a vehicle and determines whether the driver and the vehicle are qualified for parking in a specific parking place. For example, the infrastructure determines whether the driver is qualified by reading an identification number (ID) or a password that is presented by the driver. The infrastructure determines whether the vehicle is qualified by reading a vehicle identification number which is a unique number of the vehicle. The vehicle can activate and deactivate the engine by itself. The vehicle can turn on and off the power supply by itself. A state in which the vehicle engine is deactivated and the power supply is turned on is referred to as an accessory-on (ACC-On) state. The activation/deactivation of the engine and the on/off operation of the power supply may be performed according to external instructions received from the infrastructure or may be performed without depending on the external instructions. The vehicle can lock and unlock the doors by itself. The locking and unlocking of the vehicle doors may be performed according to external instructions received from the infrastructure or may be performed without depending on the external instructions. In one form, the vehicle locks the vehicle doors before entering an automated parking stage. In another form, the driving authority for the vehicle is delegated to the infrastructure from the vehicle. The driving authority means an authority to control the operations of the vehicle. The vehicle operations include steering, accelerating, braking, gear shifting, ignition ON/OFF operation, and door locking/unlocking. Since the driving authority for the vehicle is delegated to the infrastructure, the infrastructure takes complete control of the vehicle during the automated valet parking process for the vehicle. Accordingly, the vehicle is prevented from performing an unexpected operation, thereby reducing accidents in the parking lot. However, in some cases, the driving authority may be partially delegated to the infrastructure so that the vehicle can still control some of the vehicle operations, or the driving authority may be shared by the vehicle and the infrastructure. For example, a braking operation needs to be performed when an emergency occurs during the automated valet parking procedure. Therefore, when the vehicle detects a danger with the help of an ADAS sensor, the vehicle applies a brake without the intervention of the infrastructure. In addition, the vehicle checks whether a person or animal remains in the vehicle. Since vehicles are usually parked for long hours in a parking lot, if a person or animal is accidentally left in the vehicle during the parking duration, the person or animal would be in danger. Therefore, it is important to ensure that the vehicle is empty before starting an automated valet parking process. The checking for determining whether a person or animal is present in the vehicle is performed with the help of sensors mounted in the vehicle. When the automated valet parking is finished, the driving authority is automatically returned to the driver from the infrastructure.

An arrival process in which a vehicle enters a parking lot and performs parking in a specific parking spot is similar to a departure process in which a parked vehicle leaves the parking lot. Specifically, the vehicle receives a departure request. The driver (i.e., owner or user of the vehicle) makes the departure request using a communication device, such as smartphone or mobile terminal, which can communicate with the infrastructure. When the driver makes the departure request, the driver transmits vehicle information and driver information to the infrastructure using the communication device. The infrastructure determines whether a target vehicle of the departure request is actually parked in the parking lot on the basis of the received vehicle information and the received driver information and checks whether the driver is a qualified driver. When the vehicle receives the departure request, the vehicle or the infrastructure checks whether a passenger is present in the vehicle. When it is determined that no passenger is present in the vehicle, the next step is pertained. When the driver makes the departure request, the driving authority is delegated from the driver to the vehicle or the infrastructure. That is, when the driver sends the departure request, the driver loses the authority to control the vehicle. In this case, the vehicle is self-controlled by a built-in controller or controlled by the infrastructure. For example, the vehicle is controlled by the built-in controller or the infrastructure such that the vehicle doors are locked when the vehicle leaves the parking spot and are unlocked when the vehicle arrives at the pickup area. When the vehicle arrives at the pickup area, the driving authority is returned to the driver from the vehicle or the infrastructure.

However, as described above, there is a case where the driving authority is partially owned by the vehicle rather than the entire driving authority being delegated to the infrastructure, or there is a case where the driving authority of the vehicle is shared by the vehicle and the infrastructure. After receiving the departure request, the vehicle performs operations to pick up the driver and leave the parking lot. That is, the vehicle departs from the parking spot upon receiving a departure signal. To this end, the infrastructure can control the vehicle so that the ignition of the vehicle is turned on. The infrastructure notifies the driver of the departure of the vehicle from the parking spot.

In step (2), a target position, a guide route, and a driving route are determined. The determination of the target position, the guide route, and the driving route is performed by the infrastructure. The target position, the guide route, and the driving route determined by the infrastructure are transmitted to the vehicle. That is, the target position, the guide route, and the driving route are delivered to the vehicle both at the arrival process and the departure process.

In step (3), the autonomous driving of the vehicle is performed in the parking lot. The autonomous driving of the vehicle includes a driving operation, a stop operation, and a re-driving operation. The autonomous driving of the vehicle is performed in accordance with the instructions of the infrastructure. Alternatively, the autonomous driving of the vehicle may be performed without relying on the instructions of the infrastructure. The vehicle can autonomously drive to the target position along the guide route that falls within a permitted driving area. During the autonomous driving of the vehicle, the vehicle is controlled to drive at or below a limited speed. This speed limit may be a value transmitted from the infrastructure to the vehicle or may be a value stored in the vehicle. In addition, the vehicle is controlled not to deviate from an error margin of the given guide route while driving along the guide route. This preset error margin may be a value transmitted from the infrastructure to the vehicle or may be a value stored in the vehicle. In addition, the vehicle turns with a predetermined minimum turning radius when it is desired to turn during the autonomous driving along the guide route. This preset minimum turning radius may be a value transmitted from the infrastructure to the vehicle or may be a value stored in the vehicle. The vehicle is controlled not to exceed a predetermined maximum acceleration value when autonomously driving along the guide route. This preset maximum acceleration value may be a value transmitted from the infrastructure to the vehicle or may be a value stored in the vehicle.

In step (4), a position measurement is performed. The target of the position measurement may be a vehicle that is performing the autonomous parking operation, any obstacle existing in the parking lot, or another vehicle that is parked in the parking lot. The infrastructure measures the position of the vehicle or the obstacle and stores the measured position in a database. The infrastructure identifies and detects vehicles or obstacles and monitors each of the vehicles in the parking lot for the safety of the vehicles. Specifically, the infrastructure monitors a vehicle that is in the middle of performing autonomous parking at the target position and issues an appropriate instruction with respect to the vehicle. The vehicle can measure its position by itself. In this case, the vehicle transmits the measured position to the infrastructure. The position of the vehicle needs to be inside a predetermined error margin. The predetermined error margin is a value determined by the infrastructure. The vehicle detects obstacles present around the vehicle, measures the positions of the obstacles, and transmits the measured positions of the respective obstacles to the infrastructure. The frequency for communication between the vehicle and the infrastructure may be a predetermined frequency.

In step (5), an autonomous parking operation is performed. The autonomous parking performed in this step refers to an operation in which the vehicle enters an available parking spot after reaching the target position. The vehicle performs autonomous parking by sensing nearby obstacles or other vehicles that are parked therearound, with the help of a distance sensor mounted on the vehicle. Examples of the distance sensor mounted on the vehicle include an ultrasonic sensor, a radar sensor, a LiDAR sensor, and a camera.

In step (6), an emergency braking operation is performed. The emergency braking of the vehicle is performed according to instructions of the infrastructure or is performed according to its own decision when the vehicle detects an obstacle. The infrastructure instructs the vehicle to apply an emergency brake when it is determined that an area around the vehicle is unsafe. When the infrastructure determines that the surroundings of the vehicle become safe in a case in which the vehicle is in an emergency stop state, the infrastructure instructs the vehicle to resume autonomous driving or autonomous parking. When the vehicle detects an obstacle, the vehicle applies an emergency brake according to its own determination. In this state, the vehicle may notify the infrastructure of the emergency stop event or the type or position of the obstacle which is the cause of the emergency stop. The vehicle reduces its speed according to a predetermined deceleration value that is preset for the emergency braking. This predetermined deceleration value is a value determined by the infrastructure or a value stored in the vehicle. The predetermined deceleration value may vary depending on the type of an obstacle, the position of an obstacle, and the distance between the vehicle and an obstacle. The vehicle resumes autonomous driving or autonomous parking upon receiving a restart instruction from the infrastructure. Alternatively, the vehicle resumes the autonomous driving or autonomous parking when the vehicle self-confirms that the obstacle is removed. The vehicle reports the infrastructure of the restart of the autonomous driving or parking and of the removal of the obstacle.

In step (7), the automated valet parking procedure ends. After the vehicle has completed the autonomous driving and the autonomous parking, the infrastructure issues a control release instruction. The vehicle can activate and deactivate the engine or the power supply according to instructions of the infrastructure or without depending on the instruction of the infrastructure. The vehicle can lock and unlock the vehicle doors according to instructions received from the infrastructure or without depending on the instructions from the infrastructure. The vehicle can apply a parking brake according to instructions received from the infrastructure or without depending on the instructions from the infrastructure.

In step (8), an error control operation is performed. The error control is performed when an error occurs in communication between the vehicle and the infrastructure and/or when a mechanical error of the vehicle occurs. The infrastructure checks communication between the infrastructure and the vehicle for an error. The vehicle detects a communication error by monitoring the communication between the infrastructure and the vehicle. The vehicle detects whether a mechanical error occurs by monitoring operating states of built-in accessories including sensors mounted thereon. The vehicle detects the presence of a person or animal in the vehicle and applies an emergency brake when the presence of a person or animal is detected. The vehicle resumes autonomous parking or driving according to instructions received from the infrastructure when the vehicle is in an emergency stop state. Alternatively, the vehicle may determine, by itself, whether the cause of the emergency braking is removed and resumes autonomous parking or driving when it is confirmed that the cause of the emergency parking is removed.

FIG. 5 is a diagram illustrating a communication process performed by a vehicle and a parking infrastructure for automated valet parking according to one form of the present disclosure.

In step (1), vehicle qualification information is delivered from the vehicle to the infrastructure. The vehicle qualification information includes an identifier that distinguishes each vehicle from the other vehicles. For example, the vehicle qualification information may be a unique number of the vehicle. The vehicle qualification information is transmitted at a stage in which the vehicle enters the parking lot and the autonomous valet parking procedure is started (see (1) of FIG. 4A).

In step (2), an autonomous valet parking preparation instruction is transmitted from the infrastructure to the vehicle. The autonomous valet parking preparation instruction is transmitted before the vehicle starts its autonomous driving.

In step (3), vehicle information is transmitted from the vehicle to the infrastructure. The vehicle information includes state information and position information of the vehicle. The state information includes whether the vehicle is in a driving state, a parking stop state, or an emergency stop state. The vehicle information is transmitted periodically at a specific frequency (for example, 1 Hz which means once per second). The vehicle information is used as a parameter to determine whether a communication error has occurred between the vehicle and the infrastructure. For example, when the vehicle information does not reach the infrastructure at a specific time that is estimated on the basis of the communication frequency, the infrastructure determines that an error has occurred in communication between the vehicle and the infrastructure.

In step (4), an acknowledgment of the vehicle information is transmitted from the infrastructure to the vehicle. The acknowledgment of the vehicle information is transmitted at the same frequency as the transmission of the vehicle information that is transmitted in step (3). Therefore, the acknowledgment of the vehicle information is used as a parameter to determine whether an error has occurred in communication between the vehicle and the infrastructure. For example, when the vehicle information does not reach the infrastructure at a specific time that is estimated on the basis of the communication frequency, the infrastructure determines that an error has occurred in communication between the vehicle and the infrastructure.

In step (5), a target position and a guide route are delivered from the infrastructure to the vehicle. The delivery of the target position and the guide route may be performed either before or after an autonomous valet parking start instruction is transmitted from the infrastructure to the vehicle.

In step (6), driving area boundary information is transmitted to the vehicle from the infrastructure. The driving area boundary information includes markings (for examples, lines demarcating parking slots, a central line, and lane boundary lines demarcating a driving lane) that indicate the boundaries of a permitted driving area. The transmission of the driving area boundary information is performed after the autonomous valet parking preparation instruction is delivered. This driving area boundary information is transmitted from the infrastructure to the vehicle in the form of a parking lot map.

In step (7), the autonomous valet parking start instruction is transmitted from the infrastructure to the vehicle. The transmission of the autonomous valet parking start instruction is performed after the guide route and the driving area boundary information are delivered. Alternatively, the autonomous valet parking start instruction is transmitted when the cause of the emergency braking is removed.

In step (8), an emergency braking instruction is transmitted to the vehicle from the infrastructure.

In step (9), a vehicle control release instruction is transmitted to the vehicle from the infrastructure. The delivery of the vehicle control release instruction is performed after the vehicle is autonomously parked at the designated parking spot.

Figure 6:
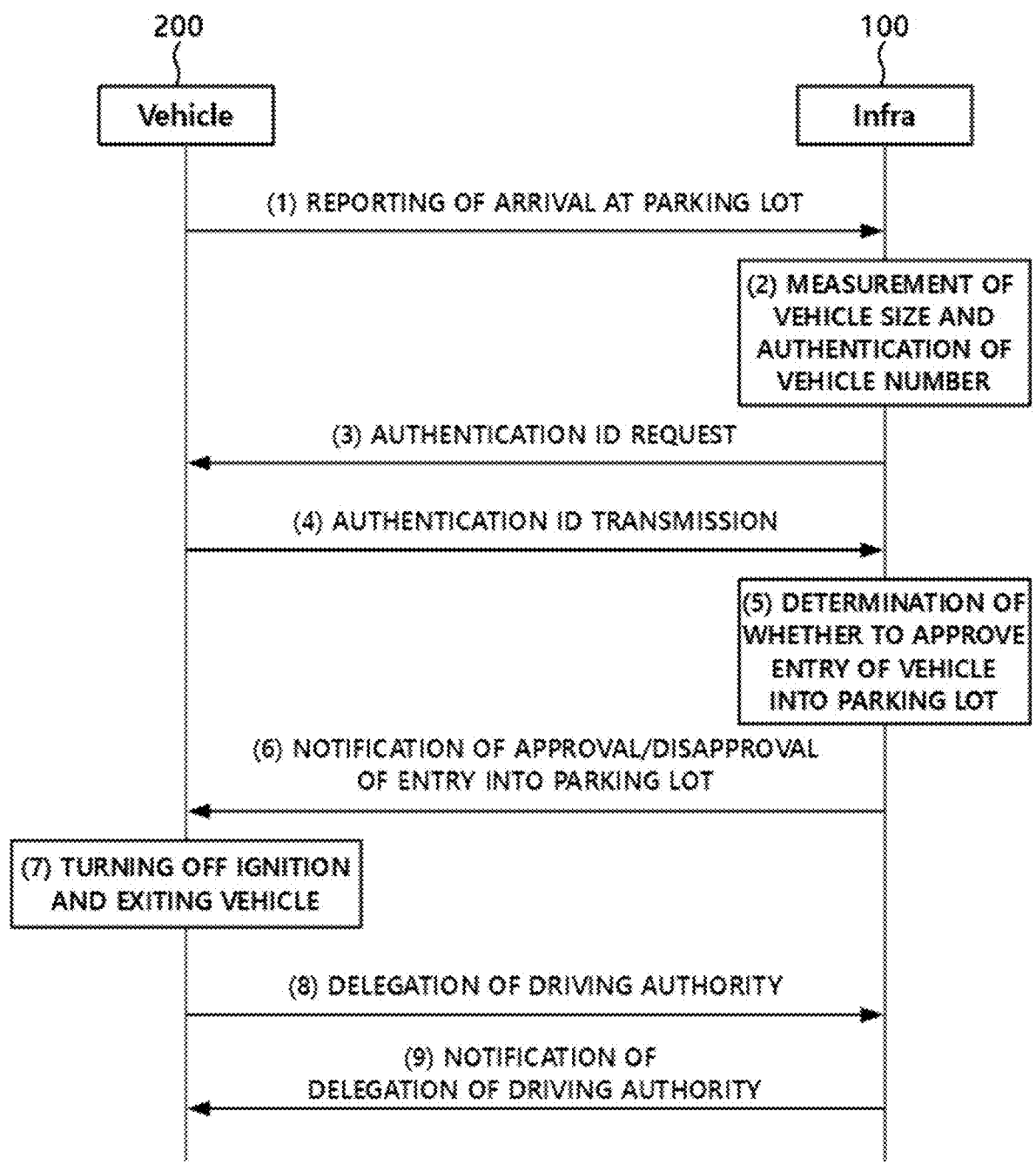
FIG. 6 is a view illustrating a communication process performed by a vehicle and an automated valet parking infrastructure, according to one form of the present disclosure.

FIG. 6 is a diagram illustrating a communication process performed between an infrastructure 100 for automated valet parking and a vehicle 200.

In step (1), the vehicle 200 enters a parking lot and stops at a predetermined position. This stop position may be an entrance gate of the parking lot. The vehicle 200 reports its arrival to the infrastructure 100. In step (2), the infrastructure 100 measures the dimensions of the vehicle 200 and authenticates the vehicle 200 on the basis of an authentication ID of the vehicle 200. In step (3), the infrastructure 100 transmits an authentication ID submission request to the vehicle 200. In step (4), the vehicle 200 transmits the authentication ID to the infrastructure 100. In step (5), the infrastructure 100 determines whether to allow entry of the vehicle 200 into the parking lot on the basis of the received authentication ID. In step (6), the infrastructure 100 notifies the vehicle whether the vehicle 200 is permitted to enter the parking lot on the basis of the authentication results. For example, the infrastructure 100 displays a message indicating approval or disapproval of the entry of the vehicle into the parking lot on a display panel installed around the stop position. The driver drives the vehicle 200 to a drop-off area when the entry of the vehicle into the parking lot is approved. In step (7), the driver turns off the ignition, gets out of the vehicle 200, locks the vehicle doors, and leaves the drop-off area. In step (8), a driving authority to control the vehicle 200 is delegated from the vehicle 200 (or the driver) to the infrastructure 100. In addition, in step (9), the infrastructure 100 notifies the driver that it takes the authority to control the vehicle 200 in the parking lot. Such a notification is sent to a driver's smart device through a mobile communication network.

Figure 7:
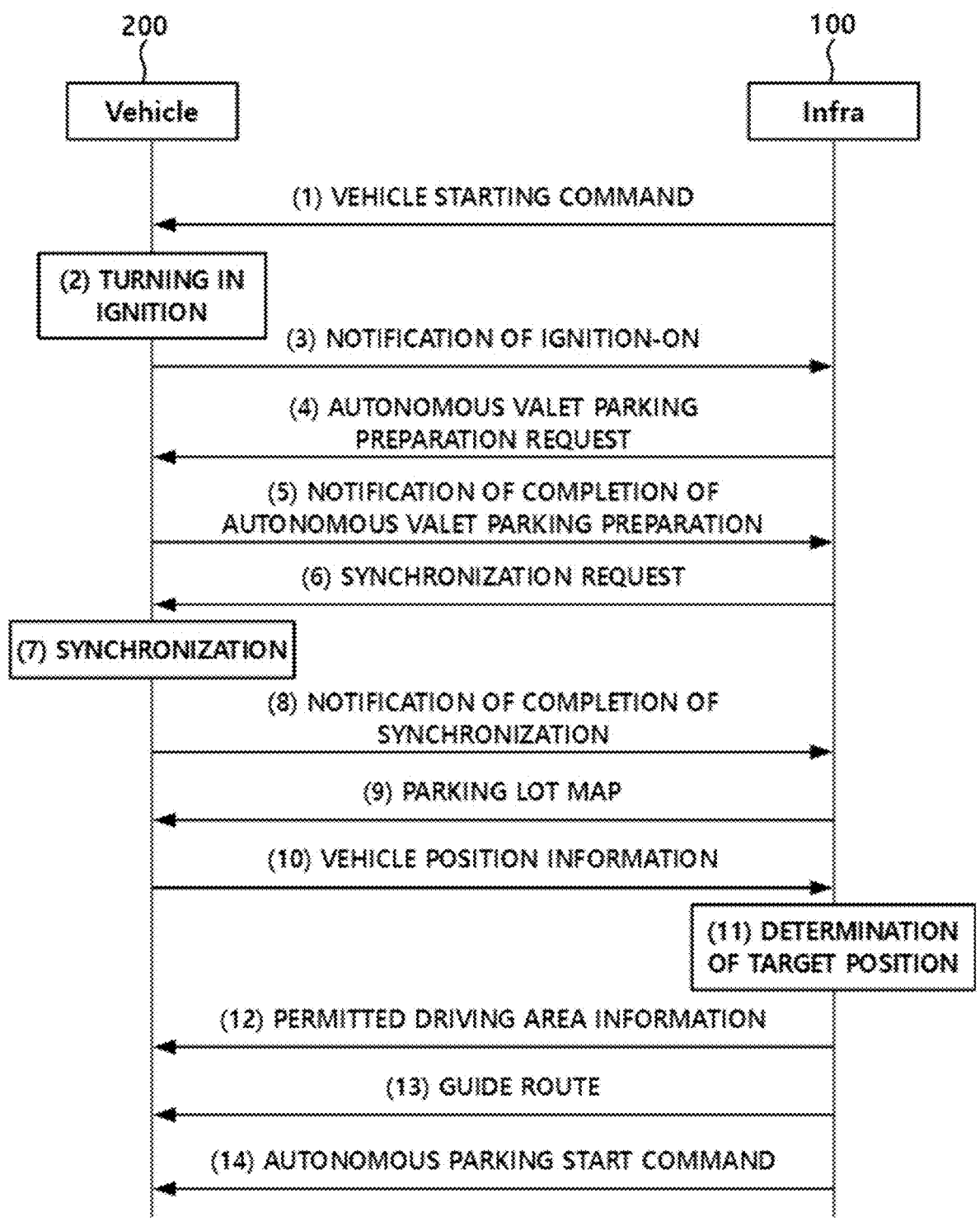
FIG. 7 is a view illustrating a communication process performed by a vehicle and an automated valet parking infrastructure, according to one form of the present disclosure.

FIG. 7 is a diagram illustrating a communication process performed between a parking infrastructure 100 for automated valet parking and a vehicle 200.

In step (1), the infrastructure 100 transmits an engine activation request to the vehicle 200. In step (2), the vehicle 200 activates the engine according to the engine activation request transmitted from the infrastructure 100. In step (3), the vehicle 200 transmits to the infrastructure 100 a notification that the engine activation is completed, after activating the engine. In step (4), the infrastructure 100 transmits an automated valet parking preparation request to the vehicle 200. In step (5), the vehicle 200 transmits a reply to the automated valet parking preparation request to the infrastructure 100. The reply is a message of OK indicating that the preparation for automated valet parking is completed or a message of NG indicating that the preparation for automated valet parking is not completed. In step (6), the infrastructure 100 transmits a synchronization request to the vehicle 200. The synchronization request is a request for instructing synchronization of time such that the timer of the infrastructure 100 is synchronized with the timer of the vehicle 200. For example, the synchronization request includes information about time indicated by the timer of the infrastructure 100. In step (7), the vehicle 200 performs the synchronization according to the synchronization request. In step (8), the vehicle 200 transmits to the infrastructure 100 a notification that the synchronization is completed, after performing the synchronization. For example, until the synchronization between the infrastructure 100 and the vehicle 200 is completed, a plurality of synchronization requests may be transmitted from the infrastructure 100 to the vehicle 200. In step (9), the infrastructure 100 transmits parking lot map information to the vehicle 200. The parking lot map information includes marking information. In step (10), the vehicle 200 estimates or calculates the position of the vehicle 200 on the basis of the transmitted marking information, and the vehicle 200 transmits the estimated position of the vehicle 200 to the infrastructure 100. In step (11), the infrastructure 100 determines a target position (for example, parking spot). In step (12), the infrastructure 100 transmits information on a permitted driving area to the vehicle 200. For example, the infrastructure 100 transmits boundary information of the permitted driving area to the vehicle 200. In step (13), the infrastructure 100 transmits a guide route to the vehicle 200. In step (14), the infrastructure 100 transmits an automated valet parking start instruction to the vehicle 200.

Figure 8:
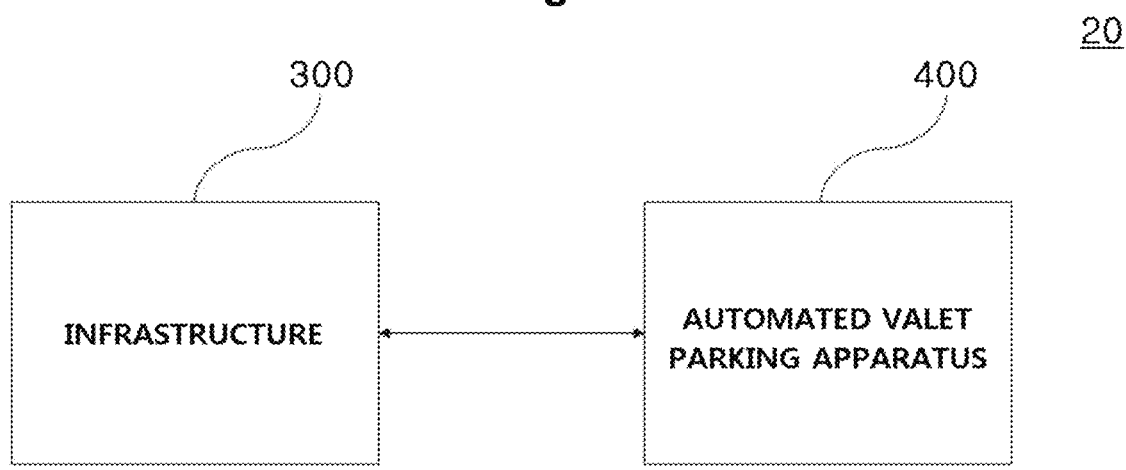
FIG. 8 is a view illustrating an automated valet parking system according to one form of the present disclosure.

FIG. 8 is a diagram illustrating an automated valet parking system according to one form of the present disclosure. Referring to FIGS. 1 to 8, an automated valet parking system 20 includes an infrastructure 300 and an automated valet parking apparatus 400.

The automated valet parking system 20 to be described with reference to FIG. 8 below can perform the functions of the automated valet parking system 10 that has been described above with reference to FIG. 1. Specifically, the infrastructure 300 to be described below with reference to FIG. 8 can perform the functions of the infrastructure 100 which has been described with reference to FIG. 1, and the automated valet parking apparatus 400 to be described with reference to FIG. 8 can perform the functions of the automated valet parking apparatus 200 that has been described with reference to FIG. 1. Hereinafter, for convenience of description, a description of the same functions will be omitted.

The infrastructure 300 refers to an apparatus or system for operating, managing, and controlling constituent elements involved in performing automated valet parking.

The infrastructure 300 determines whether automated valet parking for the automated valet parking apparatus 400 can be performed in the parking facility. According to forms, the infrastructure 300 determines whether automated valet parking for the automated valet parking apparatus 400 can be performed in the parking facility on the basis of the results of checking of specific sensors and specific functions of the automated valet parking apparatus 400.

The automated valet parking apparatus 400 performs automated valet parking under the control of the infrastructure 300. According to forms, the automated valet parking apparatus 400 transmits a response to the infrastructure 300 for each response request issued by the infrastructure 300.

For example, when the infrastructure 300 issues a response request, the automated valet parking apparatus 400 transmits a response of each sensor mounted on the automated valet parking apparatus 400 to the infrastructure 300, or transmits an operation execution result to the infrastructure 300 after performing a predetermined operation.

Figure 9:
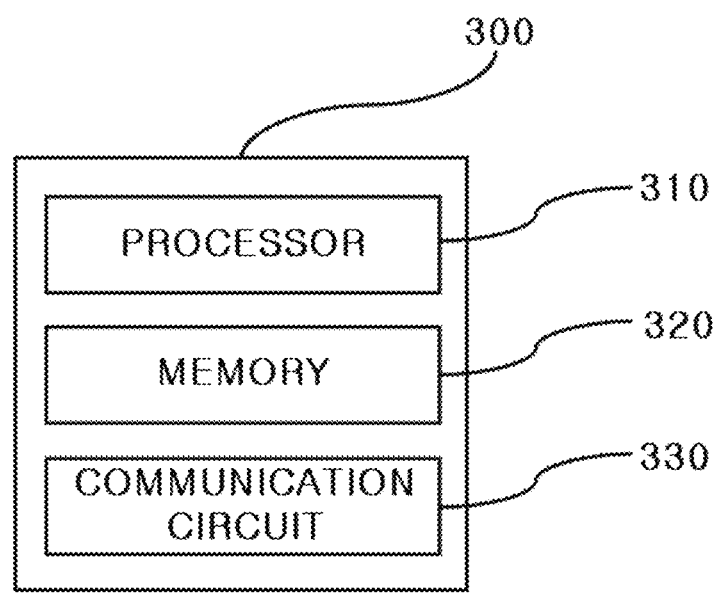
FIG. 9 is a diagram illustrating an infrastructure according to one form of the present disclosure.

FIG. 9 is a diagram illustrating an infrastructure according to one form of the present disclosure. Referring to FIGS. 1 to 9, the infrastructure 300 includes a processor 310, a memory 320, and a communication circuit 330.

The processor 310 controls the overall operation of the infrastructure 300. In some forms, the processor 310 controls the operation of the memory 320 and the operation of the communication circuit 330.

The processor 310 receives data, processes the received data, and outputs the resulting data obtained through the data processing. For example, the data may be control instructions for controlling specific operations.

In some forms, the processor 310 loads and executes a program (or application) stored in the memory 320 and controls the infrastructure 300 according to the instructions contained in the program. That is, the operation of the infrastructure 300 described herein should be interpreted as the operation performed by the processor 310 according to the instructions described in the program executed by the processor 310. For example, the program executed by the processor 310 adopts a password authentication method according to forms of the present disclosure.

The memory 320 saves or retains data desired for the operation of the infrastructure 300. In some forms, the memory 320 saves data, reads stored data, or alters or deletes stored data at the request of the infrastructure 300 (or the processor 310). For example, the memory 320 includes at least one of a nonvolatile memory and a volatile memory.

The communication circuit 330 exchanges data with an external device (i.e., automated valet parking apparatus 400). In some forms, the communication circuit 330 receives and transmits data by using a wireless communication protocol or a cable communication protocol. Examples of the wireless communication protocol and the cable communication protocol will not be described redundantly because they are described above.

The communication circuit 330 enables transmission of data to the automated valet parking apparatus 400 from the infrastructure 300 and receives data from the automated valet parking apparatus 400 under the control of the processor 310. The received data is processed by the processor 310. For example, the communication circuit 330 receives data indicating the status of the automated valet parking apparatus 400 from the automated valet parking apparatus 400.

Figure 10:
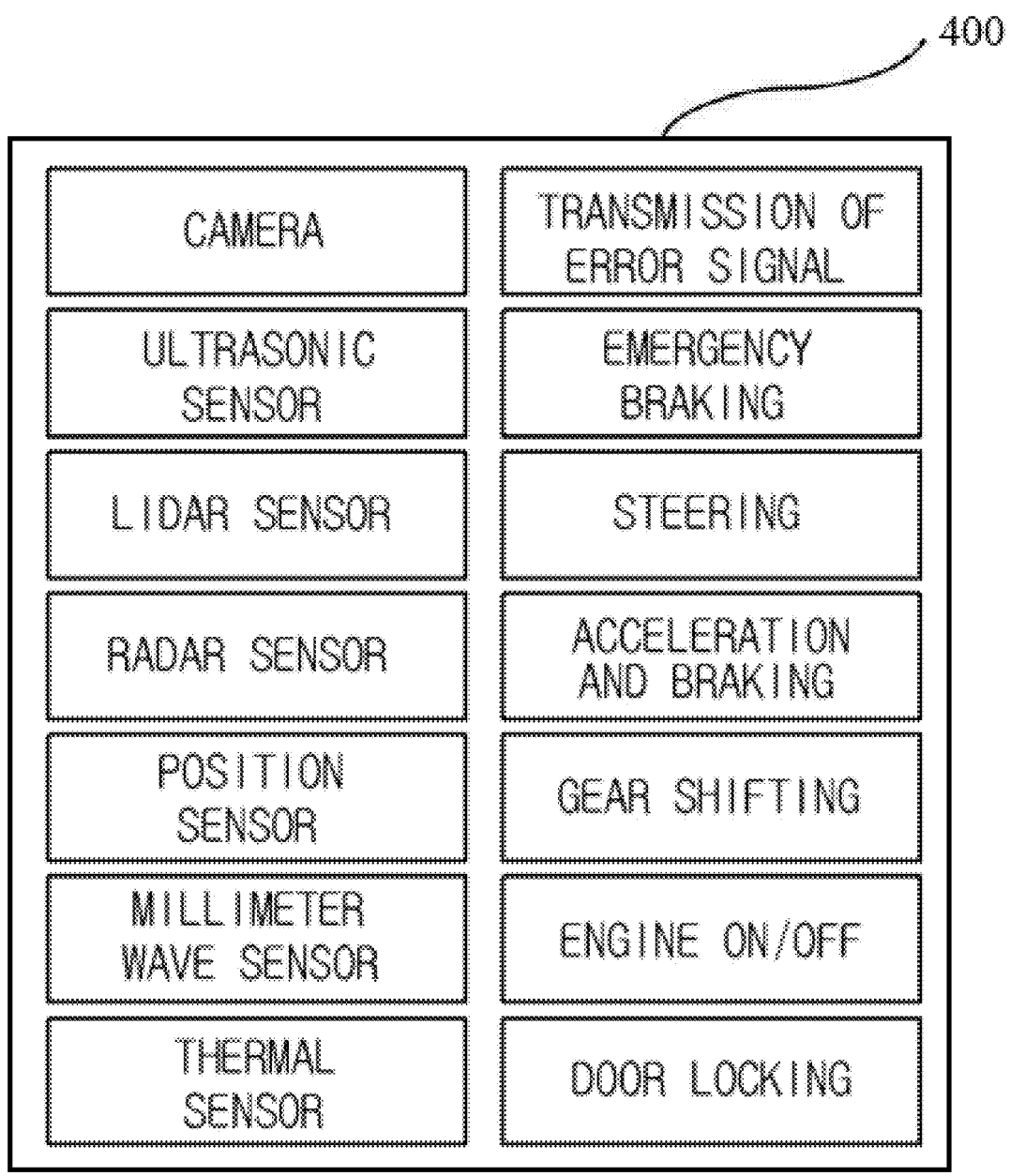
FIG. 10 is a view illustrating sensors and operations according to forms of the present disclosure.

FIG. 10 is a view illustrating sensors and operations according to forms of the present disclosure. Referring to FIGS. 1 to 10, the automated valet parking apparatus 400 includes sensors and has functions desired for automated valet parking.

The automated valet parking apparatus 400 is equipped with sensors used to recognize its surroundings. That is, the automated valet parking apparatus 400 recognizes its surroundings using the mounted sensors. The sensors mounted on the automated valet parking apparatus 400 include at least one sensor selected from among a camera, an ultrasonic sensor, a LiDAR sensor, a radar sensor, a position sensor, a millimeter wave sensor, and a thermal sensor, but are not limited thereto.

The camera takes images and generates image data. According to forms, the camera takes still images or moving images (i.e., videos).

The ultrasonic sensor outputs ultrasonic waves and receives incoming ultrasonic waves. The automated valet parking apparatus 400 can measure a distance to a surrounding object or recognize the shape of a surrounding object by using the ultrasonic sensor.

The LiDAR sensor outputs light (laser) and receives incoming light. The automated valet parking apparatus 400 can measure a distance to a surrounding object or recognize the shape of a surrounding object by using the LiDAR sensor. According to forms, the automated valet parking apparatus 400 recognizes its surroundings as an image by using the LiDAR sensor.

The radar sensor outputs electromagnetic waves and receives incoming electromagnetic waves. The automated valet parking apparatus 400 can measure a distance to a surrounding object or recognize the shape of a surrounding object by using the radar sensor.

The automated valet parking apparatus 400 performs desired operations that include at least one operation selected from among error signal transmission, emergency braking, steering, accelerating, braking, gear shifting, ignition on/off operation, and door locking/unlocking.

The error signal transmission refers to an operation in which the automated valet parking apparatus transmits an error signal indicating the occurrence of the error or fault to a predetermined place (for example, infrastructure 300) when the automated valet parking apparatus 400 detects any error or fault occurring in the automated valet parking apparatus 400.

The emergency braking refers to an operation in which the automated valet parking apparatus 400 applies an emergency brake when receiving an external control signal or when it detects an obstacle.

The steering refers to an operation of controlling the orientation of the automated valet parking apparatus 400. For example, the steering operation includes a left turn operation.

The ignition on/off operation refers to an operation in which the automated valet parking apparatus 400 turns on/off the ignition thereof according to a control signal received from the outside or according to a determination made by itself. According to forms, the ignition on/off operation includes a power supply on/off operation and an engine activation/deactivation operation.

According to forms of the present disclosure, in order for the automated valet parking apparatus 400 to perform automated valet parking in a parking facility, the automated valet parking apparatus 400 needs to satisfy conditions desired by the parking facility. That is, in order for the automated valet parking apparatus 400 to perform automated valet parking in a specific parking facility, the automated valet parking apparatus 400 needs to be equipped with specific sensors and specific functions. For example, in order for the automated valet parking apparatus 400 to perform automated valet parking, the automated valet parking apparatus 400 needs to be equipped with a camera, an ultrasonic sensor, and a LiDAR sensor and to be equipped with an error signal transmission function.

If the automated valet parking apparatus 400 enters an automated valet parking procedure although it does not satisfy the conditions desired by the parking facility, many problems occur. For example, a parking delay will occur or the automated valet parking apparatus 400 will be damaged during the parking process. According to forms of the present disclosure, it is determined whether the automated valet parking apparatus 400 satisfies the conditions desired by a parking facility before the automated valet parking apparatus 400 satisfies performs automated parking. That is, the automated valet parking apparatus 400 performs or does not perform automated parking depending on the determination result. Therefore, the automated valet parking apparatus 400 can efficiently and stably perform automated valet parking.

Figure 11:
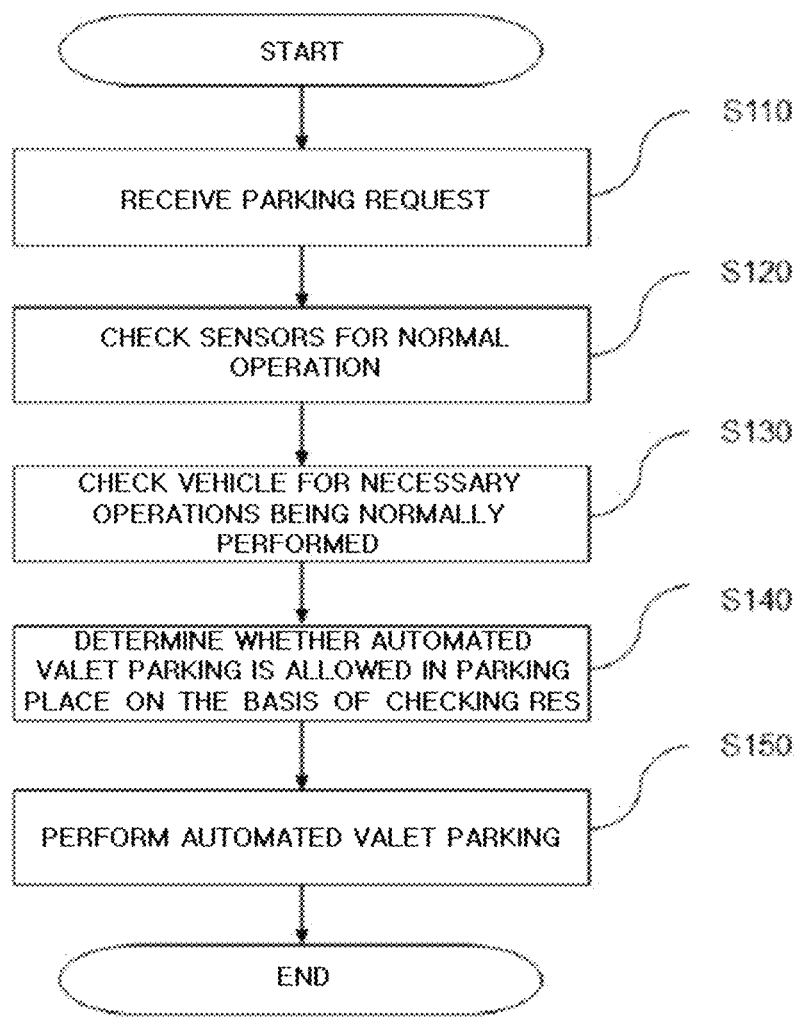
FIG. 11 is a flowchart illustrating an automated valet parking method according to one form of the present disclosure.

FIG. 11 is a flowchart illustrating an automated valet parking method according to one form of the present disclosure. Referring to FIG. 11, the automated valet parking method is performed by an infrastructure 300. Referring to FIGS. 1 to 11, the infrastructure 300 receives a parking request in step S110. The parking request may be transmitted, not limitedly, from the automated valet parking apparatus 400 or from the driver's terminal of the automated valet parking apparatus 400.

The infrastructure 300 checks whether the sensors of the automated valet parking apparatus 400 normally operate in step S120. According to forms, the infrastructure 300 transmits a response request to the automated valet parking apparatus 400, receives a response from the automated valet parking apparatus 400, and determines whether the sensors of the automated valet parking apparatus 400 normally operate on the basis of the response. The infrastructure 300 generates a list of sensors that normally operate among the sensors of the automated valet parking apparatus 400 according to the checking results.

The infrastructure 300 checks whether specific functions or operations of the automated valet parking apparatus 400, which are desired for automated valet parking, can be normally performed by the automated valet parking apparatus 400 in step S130. According to forms, the infrastructure 300 transmits an operation execution request to the automated valet parking apparatus 400, receives an operation execution result from the automated valet parking apparatus 400, and determines whether the sensors of the automated valet parking apparatus 400 normally operate on the basis of the operation execution result. The infrastructure 300 generates a list of desired functions or operations that are to be performed by the automated valet parking apparatus 400 for automated valet parking in a parking facility.

The infrastructure 300 determines whether the automated valet parking of the automated valet parking apparatus 400 is allowed in a parking facility on the basis of the checking results. According to forms, the infrastructure 300 determines whether the automated valet parking of the automated valet parking apparatus 400 is allowed on the basis of the list of sensors that normally operate and the list of desired functions or operations that can be performed by the automated valet parking apparatus 400.

The infrastructure 300 compares the list of normally operating sensors among the sensors of the automated valet parking apparatus 400 with a reference sensor list to determine whether the automated valet parking of the automated valet parking apparatus is allowed. The reference sensor list refers to a list of sensors desired for automated valet parking in a parking facility in which the infrastructure 300 provides an automated valet parking service.

According to forms, the infrastructure 300 determines a target position for the automated valet parking apparatus 400 and generates a list of sensors desired for automated valet parking at the target position. The sensors vary depending on the target position for parking. For example, parking at a first target position may need a camera and a LiDAR sensor. On the other hand, parking at a second target position may need a camera, a LiDAR sensor, and a position sensor as the desired sensors.

The infrastructure 300 compares the list of normally operating sensors among the sensors of the automated valet parking apparatus 400 with a list of desired sensors for a specific target position, and determines whether the automated valet parking of the automated valet parking apparatus 400 is allowed at the specific target position on the basis of the comparison result.

The infrastructure 300 compares the list of desired functions or operations that can be performed by the automated valet parking apparatus 400 with a reference operation list, and determines whether the automated valet parking of the automated valet parking apparatus 400 is allowed on the basis of the comparison result. The reference operation list refers to a list of functions or operations desired by a parking facility in which the infrastructure 300 provides an automated valet parking service.

The infrastructure 300 supports or enables automated valet parking for the automated valet parking apparatus 400 on the basis of the determination result in step S510. According to forms, the infrastructure 300 provides a notification that automated valet parking for the automated valet parking apparatus 400 is allowed on the basis of the determination result. For example, the infrastructure 300 provides at least one of a target position and a guide route for automated valet parking to the automated valet parking apparatus 400 depending on the determination result.

When it is determined that the automated valet parking for the automated valet parking apparatus 400 is not allowed in the parking facility, the infrastructure 300 may provide information on another parking facility in which it is assumed that automated valet parking can be performed by the automated valet parking apparatus 400 on the basis of the list of normally operating sensors of the automated valet parking apparatus 400 and the list of desired functions or operations that can be performed by the automated valet parking apparatus 400. For example, the infrastructure 300 provides information on a parking facility in which it is assumed that automated valet parking can be performed by the automated valet parking apparatus 400 among nearby parking facilities, on the basis of the list of normally operating sensors of the automated valet parking apparatus 400 and the list of desired functions or operations that can be performed by the automated valet parking apparatus 400.

According to forms of the present disclosure, it is first determined whether the automated valet parking apparatus 400 satisfies the conditions desired by a parking facility before the automated valet parking apparatus 400 performs automated valet parking, and the automated valet parking apparatus 400 then performs automated valet parking in the parking facility when the determination result shows that the automated valet parking is allowed in the parking facility. Therefore, the automated valet parking apparatus 400 can efficiently and stably perform automated valet parking.

Figure 12:
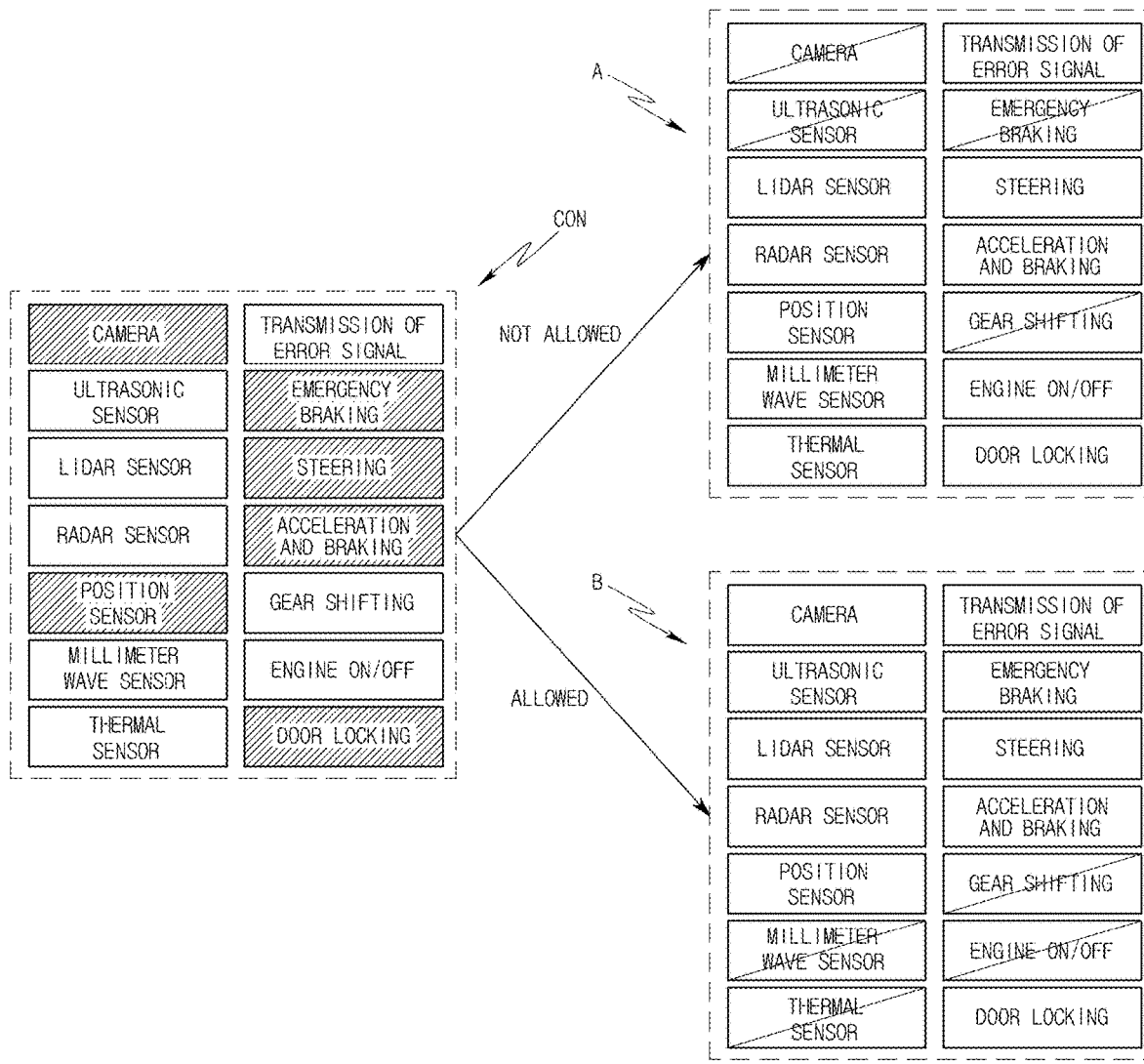
FIG. 12 is a diagram illustrating an automated valet parking method according to one form of the present disclosure.

FIG. 12 is a diagram illustrating an automated valet parking method according to one form of the present disclosure. FIGS. 1 to 12 show the conditions CON desired by a parking facility and first and second checking results A and B used to determine whether an automated valet parking apparatus 400 can perform automated valet parking in the parking facility.

The conditions CON desired by the parking facility include a first condition in which a camera, a LiDAR sensor, and a position sensor among the sensors of the automated valet parking apparatus 400 normally operate and a second condition in which emergency braking, steering, acceleration and braking, and door locking/unlocking can be performed among desired functions or operations.

The first checking result A shows that among the sensors of the automated valet parking apparatus 400, only the LiDAR sensor, the radar sensor, the position sensor, the millimeter wave sensor, and the thermal sensor normally operate. That is, the camera and the ultrasonic sensor are not included in the automated valet parking apparatus 400 or do not normally operate. The second checking result B shows that among the functions or operations of the automated valet parking apparatus 400, the error signal transmission, the steering, the acceleration and braking, the ignition on/off operation, and the door locking/unlocking can be performed by the automated valet parking apparatus 400. That is, the emergency braking and the gear shifting cannot be performed by the automated valet parking apparatus 400.

When the first checking result A is obtained as the result of the checking of the automated valet parking apparatus 400, the automated valet parking apparatus 400 does not satisfy the desired conditions desired by the parking facility (for example, in terms of the absence of a camera and the inability to perform emergency braking), the infrastructure 300 does not proceed with the automated valet parking procedure for the automated valet parking apparatus 400 on the basis of the first checking result A.

The second checking result B shows that the LiDAR sensor, the radar sensor, the position sensor, the millimeter wave sensor, and the thermal sensor among the sensors of the automated valet parking apparatus 400 normally operate, and that the error signal transmission, the steering, the acceleration and braking, the ignition on/off operation, and the door locking/unlocking can be performed by the automated valet parking apparatus 400. That is, the millimeter wave sensor and the thermal sensor are abnormal or are not included in the automated valet parking apparatus 400, and the gear shifting and the ignition on/off operation cannot be performed by the automated valet parking apparatus 400.

When the second checking result B is obtained as the result of the checking of the automated valet parking apparatus 400, although the automated valet parking apparatus 400 does not have some sensors and some functions or operations, the automated valet parking apparatus 400 satisfies the desired conditions for automated valet parking in the parking facility. Therefore, it is determined that automated valet parking of the automated valet parking apparatus 400 can be performed on the basis of the second checking result B.

Figure 13:
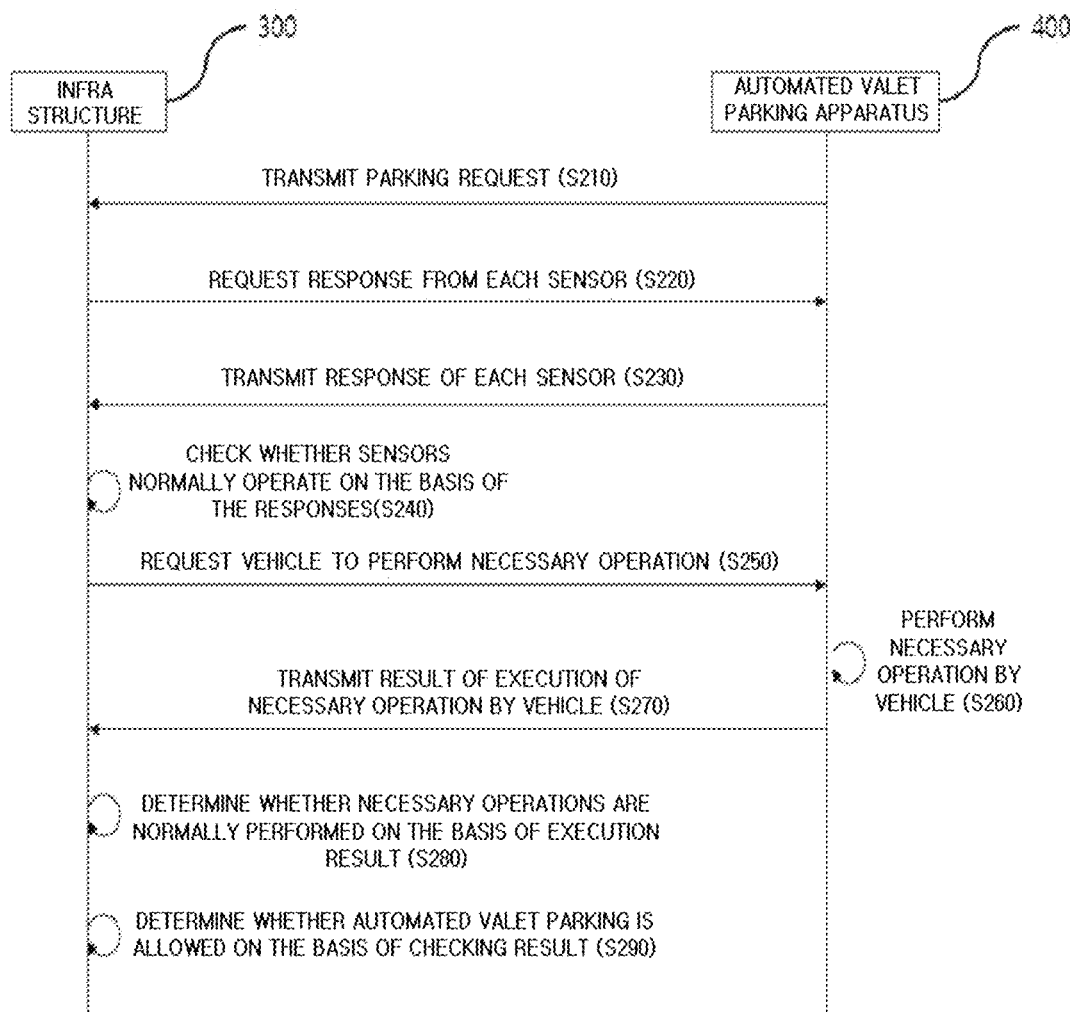
FIG. 13 is a diagram illustrating an automated valet parking method according to one form of the present disclosure.

FIG. 13 is a diagram illustrating an automated valet parking method according to one form of the present disclosure. The automated valet parking method illustrated in FIG. 13 is performed by the infrastructure 300 and the automated valet parking apparatus 400 that have been described above with reference to FIG. 8. Referring to FIGS. 1 to 13, the automated valet parking apparatus 400 transmits a parking request to the infrastructure 300 in step S210.

The infrastructure 300 checks the operation of each of the sensors of the automated valet parking apparatus 400. The infrastructure 300 makes a response request with respect to each of the sensors of the automated valet parking apparatus 400 in step S220. According to forms, the automated valet parking apparatus 400 transmits a list of possessed sensors to the infrastructure 300, and the infrastructure 300 checks the operation of each of the possessed sensors on the basis of the list of possessed sensors. For example, the infrastructure 300 sequentially makes a response request with respect to each of the sensors included in the list of possessed sensors.

The automated valet parking apparatus 400 operates each of the sensors according to each response request and transmits a response of each of the sensors to the infrastructure 300 in step S230. The infrastructure 300 checks whether the sensors of the automated valet parking apparatus 400 normally operate on the basis of the responses of the respective sensors in step S240.

In some forms, the infrastructure 300 makes a request for a surrounding environment recognition result of the automated valet parking apparatus 400. The automated valet parking apparatus 400 recognizes the surroundings thereof with the help of the sensors according to the request and transmits the recognition result to the infrastructure 300. The infrastructure 300 compares the recognition result received from the automated valet parking apparatus 400 with information on surroundings of the automated valet parking apparatus 400, thereby determining whether the sensors are normal on the basis of the comparison result.

According to forms, when checking the operation of the camera of the automated valet parking apparatus 400, the infrastructure 300 requests a camera image from the automated valet parking apparatus 400. The automated valet parking apparatus 400 makes the camera take an image according to the request and transmits the acquired image to the infrastructure 300. The infrastructure 300 compares the image transmitted from the automated valet parking apparatus 400 with a reference image and determines whether the camera operates normally according to the comparison result. Specifically, the infrastructure 300 determines whether the camera normally operates on the basis of the degree of match between the image transmitted from the automated valet parking apparatus 400 and the reference image. The reference image may be a pre-photographed image of a parking facility in which the automated valet parking apparatus 400 is located. That is, when the camera of the automated valet parking apparatus 400 normally operates, the reference image and the acquired image substantially match.

According to forms, when checking the operation of the ultrasonic sensor (or LiDAR sensor or radar sensor) of the automated valet parking apparatus 400, the infrastructure 300 requests a recognition result of the ultrasonic sensor from the automated valet parking apparatus 400. In response to the request, the automated valet parking apparatus 400 measures a distance between the automated valet parking apparatus 400 and a nearby object using the ultrasonic sensor and transmits the measured distance to the infrastructure 300. The infrastructure 300 determines whether or not the ultrasonic sensor normally operates on the basis of the result of the determination of whether the transmitted distance is within a reference distance range.

According to forms, when checking the operation of the ultrasonic sensor (or LiDAR sensor or radar sensor) of the automated valet parking apparatus 400, the infrastructure 300 requests a recognition result of the ultrasonic sensor from the automated valet parking apparatus 400. In response to the request, the automated valet parking apparatus 400 obtains information on a nearby object, including dimensions, shape, or form of the nearby object, using the ultrasonic sensor and transmits the obtained information to the infrastructure 300. The infrastructure 300 determines whether or not the ultrasonic sensor normally operates by comparing information on the recognized object and stored information.

According to forms, when checking the operation of the position sensor of the automated valet parking apparatus 400, the infrastructure 300 requests position information recognized by the position sensor from the automated valet parking apparatus 400. In response to the request, the automated valet parking apparatus 400 transmits the position information of the automated valet parking apparatus 400, which is measured by the position, to the infrastructure 300. The infrastructure 300 determines whether the ultrasonic sensor normally operates by comparing the position information transmitted from the automated valet parking apparatus 400 and the position information stored in the infrastructure 300.

The infrastructure 300 determines (or checks) whether desired operations desired for automated valet parking can be performed by the automated valet parking apparatus 400. The infrastructure 300 requests the automated valet parking apparatus 400 to perform a desired operation in step S250. The automated valet parking apparatus 400 performs an operation requested by the infrastructure 300 according to the operation execution request in step S260. The automated valet parking apparatus 400 transmits the result of the operation execution to the infrastructure 300 in step S270.

According to forms, the infrastructure 300 requests the automated valet parking apparatus 400 to transmit an error signal indicating the occurrence of a fault of a specific constituent element of the automated valet parking apparatus 400. For example, the infrastructure 300 may request transmission of an error signal indicating the occurrence of a fault of a steering device of the automated valet parking apparatus 400. The automated valet parking apparatus 400 may transmit the error signal indicating the occurrence of a fault of a specific constituent element specified by the infrastructure 300 to the infrastructure 300, and the infrastructure 300 may determine that an error signal transmission operation is normally performed on the basis of the received error signal. For example, the infrastructure 300 may determine whether the error signal transmission operation is normally performed by checking whether the received error signal correctly indicates an error or fault or whether the received error signal correctly indicates an error or fault of a specific constituent element.

According to forms, the infrastructure 300 may request the automated valet parking apparatus 400 to perform an emergency brake operation. For example, the infrastructure 300 may transmit an operation request signal including an operation time and an acceleration value. The automated valet parking apparatus 400 performs an emergency brake operation according to the request of the infrastructure 300 and transmits the operation result to the infrastructure 300. For example, the automated valet parking apparatus 400 reports an operation time and an acceleration value to the infrastructure 300. The infrastructure 300 determines whether the emergency brake operation is normally performed according to whether the operation time and the acceleration value are satisfied according to the received operation result.

The infrastructure 300 requests the automated valet parking apparatus 400 to perform an ignition on/off operation. The automated valet parking apparatus 400 performs an ignition on/off operation according to the request of the infrastructure 300 and transmits the operation result to the infrastructure 300. For example, the automated valet parking apparatus 400 reports the state of the automated valet parking apparatus 400 to the infrastructure 300. The infrastructure 300 determines whether the ignition on/off operation is normally performed according to a determination of whether the state of the automated valet parking apparatus 400 has transitioned from the ignition on state to the ignition off state according to the received operation result.

The infrastructure 300 determines whether to provide an automated valet parking service to the automated valet parking apparatus 400 on the basis of the checking results in step S290. According to forms, the infrastructure 300 determines whether to support automated valet parking for the automated valet parking apparatus 400 on the basis of a list of sensors that normally operate and a list of desired functions or operations that can be performed by the automated valet parking apparatus 400.

According to forms of the present disclosure, it is first determined whether the automated valet parking apparatus 400 satisfies the desired conditions desired by a parking facility before the automated valet parking apparatus 400 performs automated valet parking, and the automated valet parking apparatus 400 then performs automated valet parking in the parking facility when the determination result shows that the automated valet parking is allowed in the parking facility. Therefore, the automated valet parking apparatus 400 can efficiently and stably perform automated valet parking.

In one or more exemplary forms, the described functions may be implemented with hardware, software, firmware, or any combination thereof. When implemented with software, these functions may be stored on or transmitted to a computer-readable medium in the form of one or more instructions or codes. The computer-readable medium refers to any medium that is used to easily transfer a computer program from one computer to another. For example, it may be a communication medium or a computer-readable storage medium. The storage medium may be an arbitrary medium that can be accessed by a computer. The computer-readable media include, but are not limited to, RAMS, ROMs, EEPROMs, optical discs such as CD-ROM, magnetic disks, and any media that can be accessed by computers and which can be used to transfer a computer program in the form of instructions from one place to another. The computer-readable media are appropriately referred to as media that can be arbitrarily accessed by computers. For example, software can be transferred from websites, servers or, other remote sources through a cable or over a wireless channel. Examples of the cables include coaxial cable, fiber optic cable, twisted pair cable, and digital subscriber line (DSL), and the wireless channel uses infrared frequency waves, radio frequency waves, or ultrahigh frequency waves. In this case, the coaxial cable, the fiber optic cable, the twisted pair cable, the DL, and the wireless channels fall within the definition of the medium. The disks or discs include a compact disc (CD), a laser disc (LD), an optical disc (OD), a digital versatile disc (DVD), a floppy disk (FD), and a blu-ray disc. Discs generally refer to media from which data is optically read and disks refer to media from which data is magnetically read. Combinations of the above-mentioned media also fall within the definition of the computer-readable medium.

When forms are implemented as program code or code segments, the code segment may be a procedure, function, subprogram, program, routine, subroutine, module, software package, class, instructions, data structures, program command strings, or an arbitrary set of program command strings. One code segment may be connected with another code segment or a hardware circuit by transmitting and receiving information, data, arguments, parameters, or memory content. Information, arguments, parameters, data, and the like may be delivered, sent, or transmitted using any suitable means such as memory sharing, message delivery, token delivery, network transmission, and the like. In addition, in some aspects, steps and/or operations of a method or algorithm may reside on a mechanically readable medium and/or a computer-readable medium in the form of a combination or set of one or more codes and/or one or more instructions that can be integrated into a computer program product.

When implemented as software, the techniques described herein can be implemented as modules (for examples, procedures, functions, etc.) that perform the functions described herein. Software codes may be stored in a memory unit and may be executed by a processor. The memory unit may be embedded in a processor or may be provided outside a processor. In this case, the memory unit may be communicatively connected with the processor by various means known in the art.

When implemented as hardware, processing units may be implemented as one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, electronic devices designed to perform the functions described herein, or any combination of these.

The above-mentioned ones include one or more exemplary forms. Of course, the above-described forms do not cover all possible combinations of components and/or methods to implement the present disclosure. Thus, those skilled in the art will appreciate that many further combinations and substitutions of components and/or methods in various forms are possible. Accordingly, the above-described forms cover all such alterations, modifications, and variations that fall within the spirit and scope of the appended claims. Moreover, as to the scope of the terms "comprise" used in the detailed description or the appended claims, it is noted that it is similarly interpreted as "comprising" that is used as a transitional word in the claims.

As used herein, the terms "infer" and "inference" generally refer to a process of determining or inferring a state of a system, environment, and/or user from a set of observations of events and/or data. Inferring can be used to identify a specific situation or action, or can generate a probability distribution of certain states, for example. Inferring is probabilistic. That is, inferring may mean a calculation of a probability distribution of those states, based on study on data and events. Inferring may involve techniques used to construct a higher level event from a set of events and/or data. The inference refers to a process of inferring new events or actions from a set of observed events and/or stored event data, determining whether events are closely correlated in time, and determining whether the events and data come from one or several events and data sources.

Moreover, terms such as "component", "module", and "system" used herein may refer to, not necessarily, computer entities such as hardware, firmware, any combination of hardware and software, software, and a software program being executed. For example, the term "component" may refer to, not necessarily, a process running on a processor, a processor, an object, an executable execution thread, a program, and/or a computer. By way of illustration, both an application running on a computing device and the computing device itself may fall within the definition of the component. One or more components may reside within a process and/or an execution thread. One or more components may be collectively provided in one computer or distributed in two or more computers. In addition, these components can be executed on various computer readable media having various data structures stored thereon. Components can communicate a signal containing one or more data packets (for example, data from an arbitrary component that interacts with a local system, a component of a distributed system, and/or other systems on the basis of a signal that is transmitted over a network such as Internet) with a local and/or remote process.

What is claimed is:

1. An operation method of an infrastructure for automated valet parking, the method comprising:
   receiving a parking request from a vehicle;
   determining, by a processor, whether at least one sensor mounted in the vehicle operates normally;
   determining, by the processor, whether desired operations for the automated valet parking are performed normally by the vehicle;
   determining, by the processor, whether the automated valet parking for the vehicle is allowed based on the determined results; and
   performing, by the processor, an automated valet parking process for the vehicle based on the determined results,
   wherein determining whether the automated valet parking for the vehicle is allowed comprises: determining whether the automated valet parking can be performed based on the at least one sensor that is mounted in the vehicle and operates normally and a list of desired operations configured to be performed normally by the vehicle among the desired operations.

2. The method according to claim 1, wherein the at least one sensor mounted in the vehicle includes: at least one of a camera, an ultrasonic sensor, a radar sensor, a LiDAR sensor, an infrared sensor, a thermal sensor, a position sensor, or a millimeter wave sensor.

3. The method according to claim 1, wherein determining whether the at least one sensor operates normally comprises:
   requesting the at least one sensor to make a response;
   receiving the response the at least one sensor; and
   checking whether the at least one sensor operates normally based on the received response.

4. The method according to claim 3, further comprising:
   determining whether the at least one sensor operates normally based on whether the received response from the at least one sensor satisfies a predetermined reference condition.

5. The method according to claim 1, wherein the desired operations includes at least one operation selected from among transmission of an error signal, emergency braking, steering, acceleration and braking, gear shifting, ignition on/off operation, and door locking/unlocking.

6. The method according to claim 1, wherein determining whether desired operations for the automated valet parking are performed normally comprises:
   requesting the vehicle to perform each of the desired operations;
   receiving, from the vehicle, an operation execution result for each of the desired operations performed by the vehicle; and
   determining whether the desired operations are performed normally by the vehicle based on the received operation execution results.

7. The method according to claim 1, wherein determining whether the automated valet parking for the vehicle is allowed comprises:
   comparing the at least one sensor that is mounted in the vehicle and operates normally and a reference list of sensors; and
   determining whether the automated valet parking can be performed based on the comparison result.

8. The method according to claim 1, wherein determining whether the automated valet parking for the vehicle is allowed comprises:
   comparing a list of desired operations to be performed by the vehicle with a reference list of desired operations for the automated valet parking; and
   determining whether the automated valet parking can be performed based on the comparison result.

9. The method according to claim 1, wherein determining whether the automated valet parking is allowed further comprises:
   determining a target position for the vehicle;
   generating a list of sensors desired for automated valet parking at the target position;

comparing a list of sensors that operate normally in the vehicle with a list of sensors that are desired for the automated valet parking; and determining whether the automated valet parking can be performed based on the comparison result.

10. The method according to claim 1, further comprising: in response to automated valet parking is not being allowed in a parking facility, providing the vehicle with information on a different parking facility in which automated valet parking of the vehicle is allowed based on a list of sensors that are mounted in the vehicle and operate normally, and the list of desired operations to be performed by the vehicle.

11. The method according to claim 1, further comprising: receiving a control authority for the vehicle from the vehicle after receiving the parking request.

12. The method according to claim 1, further comprising: returning a control authority for the vehicle after the automated valet parking for the vehicle is finished.

13. The method according to claim 1, further comprising: transmitting an emergency stop instruction to the vehicle when any fault is detected inside or outside the vehicle.

14. The method according to claim 1, wherein performing the automated valet parking comprises: transmitting to the vehicle at least one of a target position that is a parking spot and a guide route leading to the target position.

15. A non-transitory computer-readable recording medium having a program recorded thereon, the program to direct a processor to perform acts of:

receiving a parking request from a vehicle;

determining whether at least one sensor mounted in the vehicle operates normally;

determining whether desired operations for automated valet parking are performed normally by the vehicle;

determining whether the automated valet parking for the vehicle is allowed based on the determined results; and performing an automated valet parking process for the vehicle based on the determined results, wherein determining whether the automated valet parking for the vehicle is allowed comprises: determining whether the automated valet parking can be performed based on the at least one sensor that is mounted in the vehicle and operates normally and a list of desired operations configured to be performed normally by the vehicle among the desired operations.

16. The non-transitory computer-readable recording medium according to claim 15, wherein the at least one sensor mounted in the vehicle includes: at least one of a camera, an ultrasonic sensor, a radar sensor, a LiDAR sensor, an infrared sensor, a thermal sensor, a position sensor, or a millimeter wave sensor.

17. The non-transitory computer-readable recording medium according to claim 15, wherein determining whether the at least one sensor operates normally comprises:

requesting the at least one sensor to make a response;

receiving the response the at least one sensor; and checking whether the at least one sensor operates normally based on the received response.

18. The non-transitory computer-readable recording medium according to claim 15, wherein the program is further configured to direct the processor to perform act of:

determining whether the at least one sensor operates normally based on whether the received response from the at least one sensor satisfies a predetermined reference condition.

19. The non-transitory computer-readable recording medium according to claim 15, wherein the desired operations includes at least one operation selected from among transmission of an error signal, emergency braking, steering, acceleration and braking, gear shifting, ignition on/off operation, and door locking/unlocking.

20. An automated valet parking infrastructure comprising:

a memory configured to store data;

a communication circuit configured to communicate with a vehicle; and a processor configured to:

determine whether sensors mounted in the vehicle operate normally, determine whether the vehicle can perform operations desired for automated valet parking, determine whether automated valet parking for the vehicle is allowed in a target parking place based on the determined results; and when the automated valet parking in the target parking place is allowed, control the infrastructure to perform the automated valet parking for the vehicle, wherein the processor is further configured to determine whether the automated valet parking can be performed based on the at least one sensor that is mounted in the vehicle and operates normally and a list of desired operations that can be performed normally by the vehicle among the desired operations.

* * * * *